United States Patent
Bowers et al.

(10) Patent No.: US 6,385,376 B1
(45) Date of Patent: May 7, 2002

(54) FUSED VERTICAL COUPLER FOR SWITCHES, FILTERS AND OTHER ELECTRO-OPTIC DEVICES

(75) Inventors: John E. Bowers, Santa Barbara; Bin Liu, Goleta; Patrick Abraham, Santa Barbara, all of CA (US); Boo-Gyoun Kim, Jyungi Do (KR); Ali Shakouri, Santa Barbara, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/425,543

(22) Filed: Oct. 22, 1999

Related U.S. Application Data

(60) Provisional application No. 60/106,393, filed on Oct. 30, 1998.

(51) Int. Cl.[7] .................................................. G02B 6/42
(52) U.S. Cl. ........................ 385/50; 385/130; 385/131; 385/16
(58) Field of Search ............................... 385/50, 37, 42, 385/43, 14, 12, 24, 16, 131, 10, 129, 130; 156/633

(56) References Cited

U.S. PATENT DOCUMENTS

| | | | |
|---|---|---|---|
| 4,475,790 A | 10/1984 | Little | 437/31 |
| 4,704,785 A | 11/1987 | Curran | 437/110 |
| 4,771,013 A | 9/1988 | Curran | 385/50 X |
| 4,829,018 A | 5/1989 | Wahlstrom | 437/51 |
| 4,924,353 A | 5/1990 | Patraw | 361/400 |
| 5,115,331 A | 5/1992 | Gookin et al. | 359/117 |
| 5,148,506 A | 9/1992 | McDonald | 385/16 |
| 5,207,864 A | 5/1993 | Bhat et al. | 156/633 |
| 5,283,844 A | 2/1994 | Rice et al. | 385/17 |
| 5,325,224 A | 6/1994 | Lang et al. | 359/139 |
| 5,355,247 A | 10/1994 | Byer et al. | 359/330 |
| 5,434,434 A | 7/1995 | Kasahara et al. | 257/84 |
| 5,472,914 A | 12/1995 | Martin et al. | 437/209 |
| 5,475,526 A | 12/1995 | Byer et al. | 359/330 |
| 5,503,704 A | 4/1996 | Bower et al. | 156/281 |

*Primary Examiner*—Phan T. H. Palmer
(74) *Attorney, Agent, or Firm*—John P. O'Banion

(57) ABSTRACT

A vertical directional coupler fabricated using wafer fusion with a very short coupling length for fabrication of switches, filters and other electro-optic devices. Using the fused vertical coupler, planar waveguides can be fabricated on two different substrates in a three-dimensional structure in which there is vertical coupling between arrays through fused regions. Switches, including crossbar switches based on coupling between independent arrays of waveguides, as well as filters, can be fabricated.

26 Claims, 14 Drawing Sheets

FUSED VERTICAL COUPLER FOR SWITCHES, FILTERS AND OTHER ELECTRO-OPTIC DEVICES

CROSS-REFERENCE TO RELATED APPLICATIONS

This application claims priority from U.S. provisional application Ser. No. 60/106,393 filed on Oct. 30, 1998.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains generally to vertical directional optical couplers, and more particularly to fused vertical couplers having a short coupling length for use in switches, filters and other electro-optic devices.

2. Description of the Background Art

Compact semiconductor optical waveguide switches are critical components in photonic integrated circuits for high speed optical communication networks and optical information processing. In many instances a large scale switching array requires low space consumption; therefore, it is essential to minimize the length of each switch. However, conventional directional couplers with laterally arranged waveguides cannot achieve the very short coupling lengths required in such applications because of low modal overlap and because of technological limits to getting uniform and small gap layers.

Vertical directional couplers, on the other hand, offer a short coupling length which can be less than 100 $\mu$m. Because of their very short coupling length, as well as the feasibility of integration with other optoelectronic devices, vertical directional couplers are attractive candidates to realize photonic switches and narrowband filters. The difficulty of separating the two vertical coupled waveguides into two distinct inputs and outputs, however, has limited the application of vertical directional couplers to large scale switching arrays. In conventional vertical couplers, the two input or output waveguides are so close together that direct coupling of individual waveguides with fibers is very difficult. This drawback has limited the practical applications of vertical couplers in fiber optic systems.

Integrated compact and narrowband optical filters are key components for dense wavelength division multiplexing (DWDM) systems as add/drop multiplexers and demultiplexers. To date, many types of add/drop filters have been proposed and realized including diffraction gratings, arrayed-waveguide gratings, Mech-Zehnder interferometers and directional couplers. Compared to other structures, asymmetric directional coupler filters using two dissimilar waveguides on III–V semiconductors are promising because of the precise control of waveguide thickness and indices during crystal growth and monolithic integration with other devices such as optical amplifiers, photodetectors, modulators and lasers. There are, however, several obstacles to using these conventional vertical coupler structures in system applications. For example, the characteristics are strongly polarization dependent. Launching the light into and coupling light out of two very close waveguides is very difficult and the coupling efficiency for two dissimilar waveguide geometries can be very different.

It is well known that the response bandwidth of an asymmetrical directional coupler is inversely proportional to both the device length and the difference of mode dispersion in the two waveguides $$\sigma = \frac{dn_1}{d\lambda} - \frac{dn_2}{d\lambda},$$

where $n_1$ and $n_2$ are effective indices of the two waveguide eigenmodes. To minimize the device length and reduce the sidelobes, the filter bandwidth can only be narrowed by increasing $\sigma$. The modal dispersion depends on two factors. The first factor is the waveguide dispersion that depends on waveguide geometry; the other factor is the material dispersion. Vertical coupler filters heretofore realized primarily use waveguide dispersion difference. A narrow bandwidth requires one of the waveguides to have a very small index difference between the core and the cladding, and a large core size, while the other one should have a large index difference and a small core size. To keep the single mode operation and a high coupling efficiency with fibers, the waveguide core size cannot be too large or too small, and this limits the bandwidth of the filter. On the other hand, the difference in effective indices between TE and TM modes for a waveguide with a large index difference and small core is much more than the TE and TM difference of another waveguide with small index difference and large core size. Consequently, these devices have a strong polarization dependence. Generally the polarization dependent waveguide shift is more than 30 nm, which is a disadvantage in fiber optic communication systems. Birefringence compensation is a known technique to solve this problem, but such a solution requires a complicated structure design and a critical material growth. Since the polarization dependence and different coupling efficiency come from the strong asymmetry of two waveguide geometries, these problems can be solved if the two waveguides have similar structures.

For waveguides with almost identical waveguide dispersions, a large material dispersion difference between two waveguides is needed to realize a narrowband polarization independent filter. It is known that a material has strong dispersion when the operation wavelength is near the bandgap. Therefore, InGaAsP material can have much higher dispersion than AlGaAs material; such as approximately 1.55 $\mu$m and 1.3 $\mu$m. For example, the material dispersion of InGaAsP ($\lambda$g=1.45 $\mu$m) at 1.55 $\mu$m is −0.48/$\mu$m. This is nearly one order of magnitude higher than that of $Al_{0.1}Ga_{0.9}As$ which is −0.059/$\mu$m. Such a large dispersion difference is very difficult to obtain if one only uses different waveguide geometries. Unfortunately, because of the large lattice mismatch, good quality InP cannot be grown on GaAs substrate or vise versa. For conventional vertical coupler filters, the difficulty of separating the two waveguides limits its application to WDM systems.

While integrated wavelength dependent couplers based on dissimilar materials are known, the devices are limited by the difference in dispersion that can be obtained with two dissimilar waveguides. Future fiber optic systems require increased levels of integration and a technology for compact WDM filters is needed.

BRIEF SUMMARY OF THE INVENTION

This foregoing problems are solved with the fused vertical coupler (FVC) of the present invention which typically has a very short coupling length, such as on the order of 62 $\mu$m.

By way of example, and not of limitation, a fused vertical coupler according to the present invention comprises a lower InP substrate, followed by an approximately 0.5 μm InGaAsP (λ=1.3 μm) guiding layer, an approximately 0.1 μm InP cladding layer, an approximately 0.4 μm InP coupling layer, an approximately 0.1 μm InP cladding layer, an approximately 0.5 μm InGaAsP (λ=1.3 μm) guiding layer, and an upper InP substrate. The InP layers can be doped, or undoped, although doping the layers facilitates fabrication of switches and filters.

A example of a method of fabricating a fused vertical coupler according to the invention, comprises the following steps. First, a wafer is grown by MOCVD or the like. The wafer generally comprises an InGaAsP guiding layer on an InP substrate, followed by an InP cladding layer, an InGaAsP etch stop layer, and an InP coupling layer. Two samples are then cleaved from the grown wafer. In the first sample, the top InP coupling layer is removed. On the second sample, a ridge waveguide structure is fabricated using standard photolithography and selective wet etching. The facets of the two samples are aligned, mated and then fused together using high temperature fusing bonding to form the coupler.

As noted, a vertical coupler according to the present invention is fabricated using wafer fusion (also called wafer bonding). Wafer fusion is a powerful technique to fabricate structures that cannot be realized by conventional epitaxial growth and processing, and permits the joining of materials with different lattice constants. In addition to the inherent advantages of combining material with different lattice constants, wafer fusion can give an extra degree of freedom in the design and fabrication of 3-D photonic devices. For example, by displacing the input and output waveguides vertically in different planes, scaling of switch arrays to large sizes is easy to realize. For purposes of such switch arrays, a PIN straight fused vertical coupler would be used.

In order to switch large number of input waveguides, it is essential to have compact, high extinction ratio fused vertical couplers. One important advantage of the strong vertical coupling provided by fused couplers of the present invention is the capability of attaining highly selective WDM add/drop multiplexers by making longer couplers with significant overcoupling. The fused vertical couplers and waveguides of the present invention give the added advantage of vertical dimension by separating the input and output waveguides to realize compact and scalable 3D directional coupler structures.

Furthermore, because of the short coupling length of fused vertical couplers according to the present invention, a vertical coupler filter (VCF) based on wafer fusion technology is made possible. With a proper design, a narrowband and polarization independence filter with two separate inputs and outputs can be easily realized which solves all of the problems with conventional coupler filters. Wafer fusion can also be used to fabricate 3-D photonic devices. For conventional vertical coupler filters, the difficulty of separating the two waveguides limits its application to WDM systems. Using wafer fusion, however, the two close inputs and two outputs can be easily separated in different planes.

An object of the invention is to is to provide a fused vertical coupler with an extremely short coupling length.

Another object of the invention is to provide a vertical coupler which uses fusion bonding during fabrication.

Another object of the invention is to provide a fused vertical coupler for joining materials with different lattice constants.

Another object of the invention is to provide a fused vertical coupler which can be used in the fabrication of 3-D photonic devices.

Another object of the invention is to provide a fused vertical coupler which permits scaling of switch arrays.

Another object of the invention is to provide a fused vertical coupler for fabricating vertical coupler filters.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is described in relation to the apparatus and operational characteristics shown in FIG. 1 through FIG. 17. It will be appreciated that the apparatus may vary as to configuration and as to details of the parts without departing from the basic concepts as disclosed herein.

1. Fused Vertical Couplers

Figure 1:
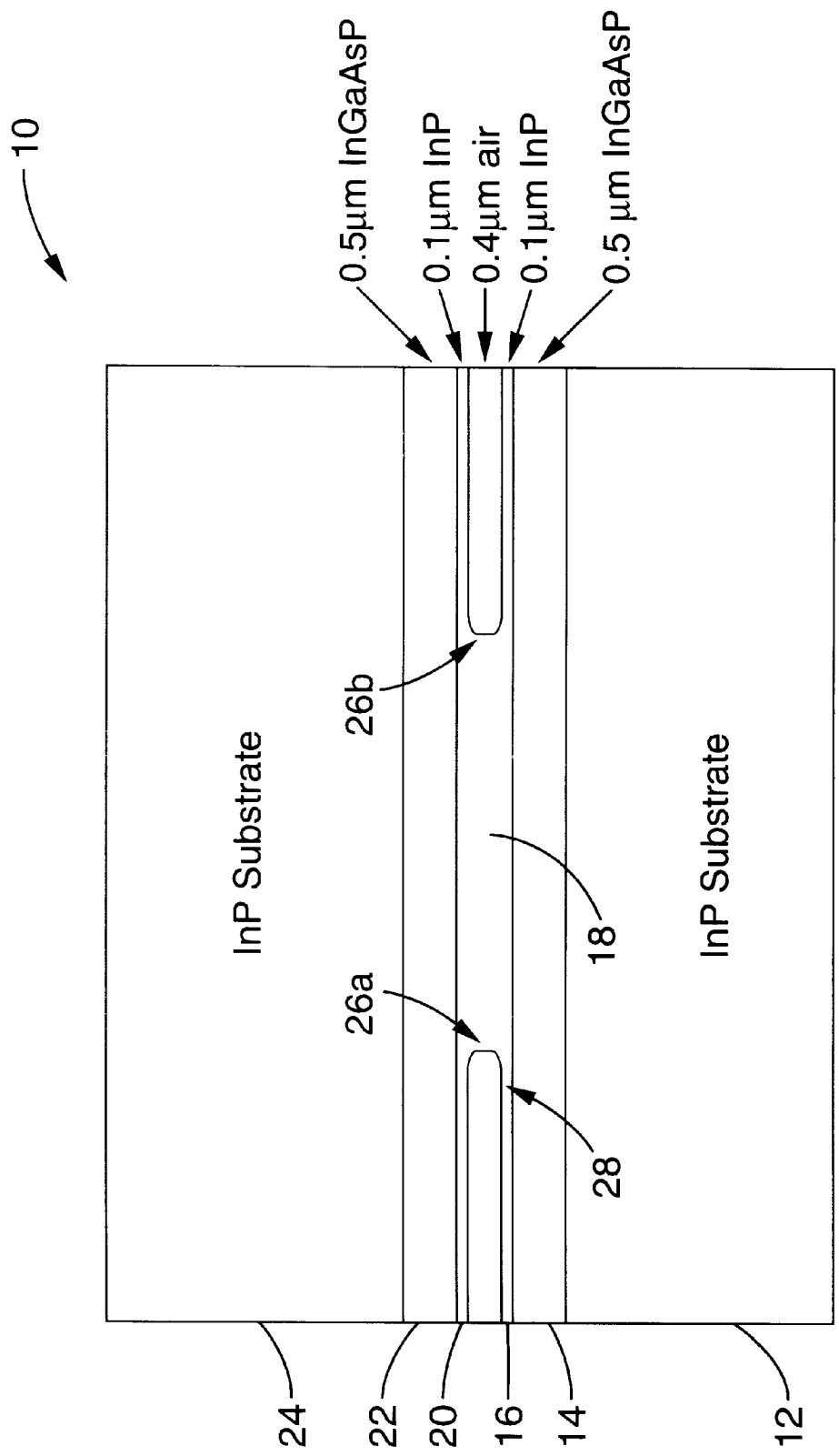
FIG. 1 is a schematic side view of a fused vertical coupler according to the present invention.

FIG. 1 is a schematic representation of a stain etched SEM picture of an actual fused vertical coupler 10 according to the present invention. As shown, the coupler comprises an InP substrate 12, followed by an approximately 0.5 $\mu$m InGaAsP ($\lambda$=1.3 $\mu$m) guiding layer 14, an approximately 0.1 $\mu$m InP cladding layer 16, an approximately 0.4 $\mu$m InP coupling layer 18, a second approximately 0.1 $\mu$m InP cladding layer 20, a second approximately 0.5 $\mu$m InGaAsP ($\lambda$=1.3 $\mu$m) guiding layer 22, and a second InP substrate 24.

EXAMPLE 1

To fabricate the vertical coupler shown, first a wafer is grown by MOCVD or the like. The wafer comprises the 0.5 $\mu$m InGaAsP guiding layer 14 on the InP substrate 12, followed by the 0.1 $\mu$m InP cladding layer 16, a 20 nm InGaAsP ($\lambda$=1.15 $\mu$m) etch stop layer (not shown), and the 0.4 $\mu$m InP coupling layer 18. Two 8×10 mm$^2$ samples are then cleaved from the grown wafer. In the first sample, the top 0.4 $\mu$m InP coupling layer is removed. On the second sample, a ridge waveguide structure is fabricated using standard photolithography and selective wet etching. The ridges 26a, 26b have widths of approximately 3 $\mu$m to 6 $\mu$m width and a height of approximately 0.4 $\mu$m, and are separated by approximately 125 $\mu$m. The faces of the two samples are aligned, mated and then fused together at a temperature of approximately 630° C. in a hydrogen atmosphere for approximately 30 minutes to produce the structure shown.

EXAMPLE 2

A stain etched SEM picture of a finished fused vertical coupler was obtained. The fused interface 28, which is approximated on FIG. 1, was not visible, even after staining. This was an indication of the high quality of the fusion process. We also found that there was mass transport at the edge of the ridge, which is beneficial to get a symmetric coupler and improves the side wall flatness.

EXAMPLE 3

Figure 2:
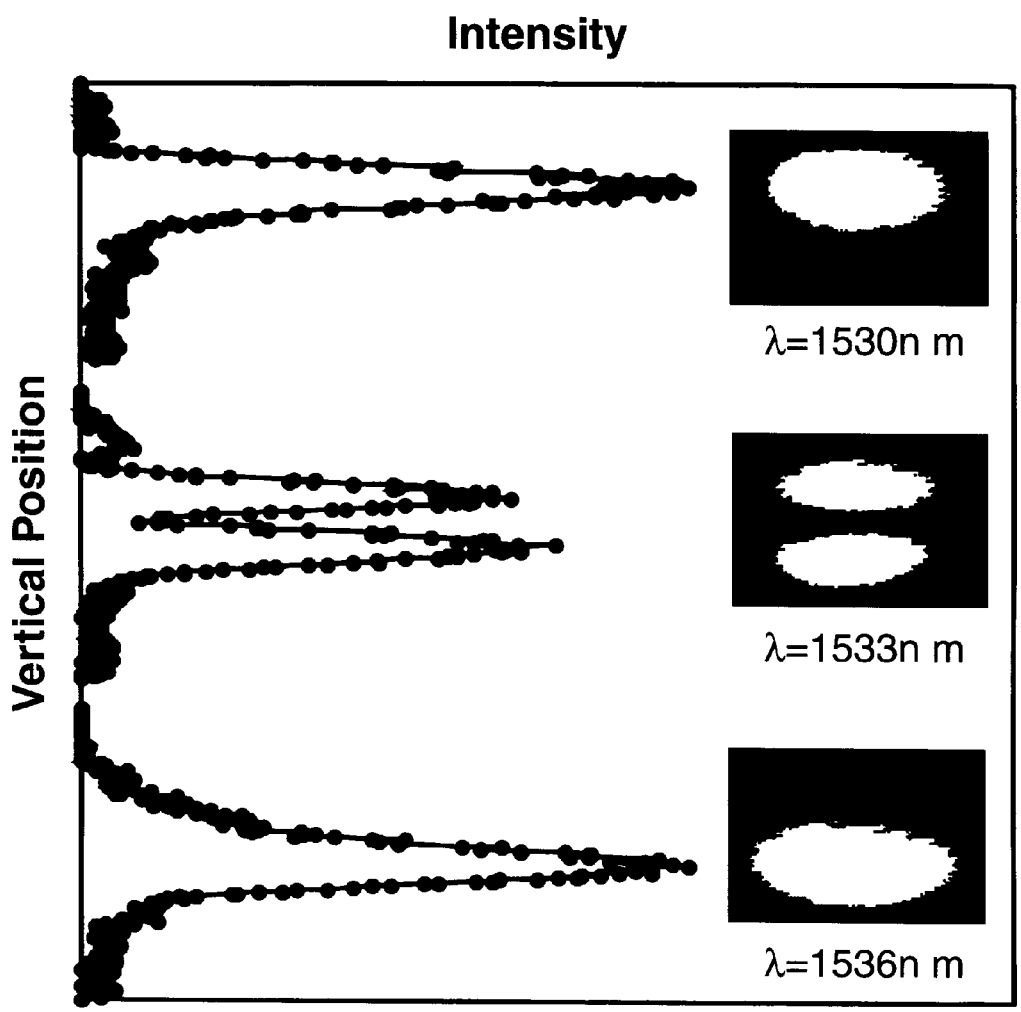
FIG. 2 is a graph showing the near field patterns for a fused vertical coupler of the type shown in FIG. 1 at wavelengths of 1530 nm, 1533 nm and 1536 nm. The width of the ridge is 3 μm, and the distance between the upper and the lower waveguides is 1.1 μm. The patterns are shown on the right and the curve on the left is the profile of the corresponding near field pattern.
Figure 3:
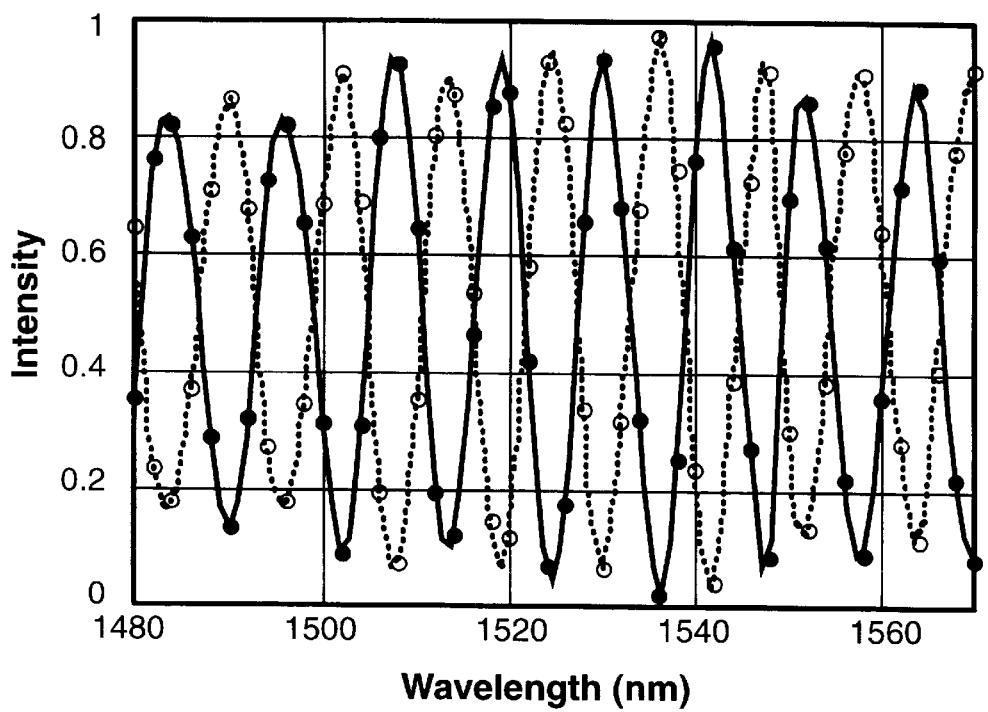
FIG. 3 is a graph showing measured intensity of the upper (closed circle) and lower (open circle) waveguides as a function of wavelength for a fused vertical coupler of the type shown in FIG. 1.

The near field pattern at the output of three fused vertical couplers were recorded by an IR camera. The light input was from a 8 $\mu$m diameter single mode fiber. The total length of the fused vertical coupler was 5.5 mm. It was found that, by changing the input wavelength, light was switched from the upper to the lower waveguide. Since the shapes of the two waveguide modes are very similar, one can get a high extinction ratio. Our measurements showed the extinction ratio was about 15 dB. This is particularly difficult to achieve in conventional high mesa vertical couplers. BPM (BeamProp, Version 2.0, Rsoft, Inc.) simulations show that extinction ratio up to 20–35 dB are possible. FIG. 2 shows the near field intensities at three different wavelengths, $\lambda$=1530 nm, $\lambda$=1533 nm, and $\lambda$=1536 nm. FIG. 3 shows the intensities of the upper and lower waveguides as a function of wavelength. From the oscillation period (about 11.5 nm) and considering material and waveguide dispersions, the index difference between the even and odd modes can be calculated which was 0.0124. The corresponding coupling length was 62 $\mu$m at 1.55 $\mu$m which agrees well with the theoretical value of 58 $\mu$m, derived from 3D BPM calculations. One important advantage of this strong vertical coupling is the capability of attaining highly selective WDM add/drop multiplexers by making longer couplers with significant overcoupling. FIG. 3 illustrates the possibility of lossless combination or splitting of two signals separated by just 6 nm. The wavelength selectivity of a fused vertical coupler can be enhanced by using strong asymmetry in the waveguide structure.

EXAMPLE 4

To investigate the optical propagation loss at 1.55 $\mu$m due to the fused interface, two single mode ridge waveguides were fabricated. The first one had a 0.5 $\mu$m InGaAsP (1.3 $\mu$m quartenary) core region, a 0.2 $\mu$m InP slab layer and a 0.6 $\mu$m InP ridge height. The second sample was identical to the first except for a fused interface in the middle of InP slab layer where the mode field was as high as 50% of maximum. A Fabry-Perot resonance technique was used to measure the optical loss. The second sample showed only 1.1 dB/cm excess loss due to the presence of the fused interface compared with the unfused single mode waveguides. We believe it can be reduced further with the improvement of the fusion process.

It will be appreciated that the issue of uniformity for fused waveguides is very important for large scale monolithic integration. For a fused wafer of 8×10 mm$^2$, we found very good uniformity in terms of excess loss or coupling length. More than 90% of the waveguides can work well, even for the ones near the edge of the fused wafers. We have also checked the multimode behavior of the 150 $\mu$m width slab fused waveguides and found that they do not show any dark spots or dead regions.

Figure 4:
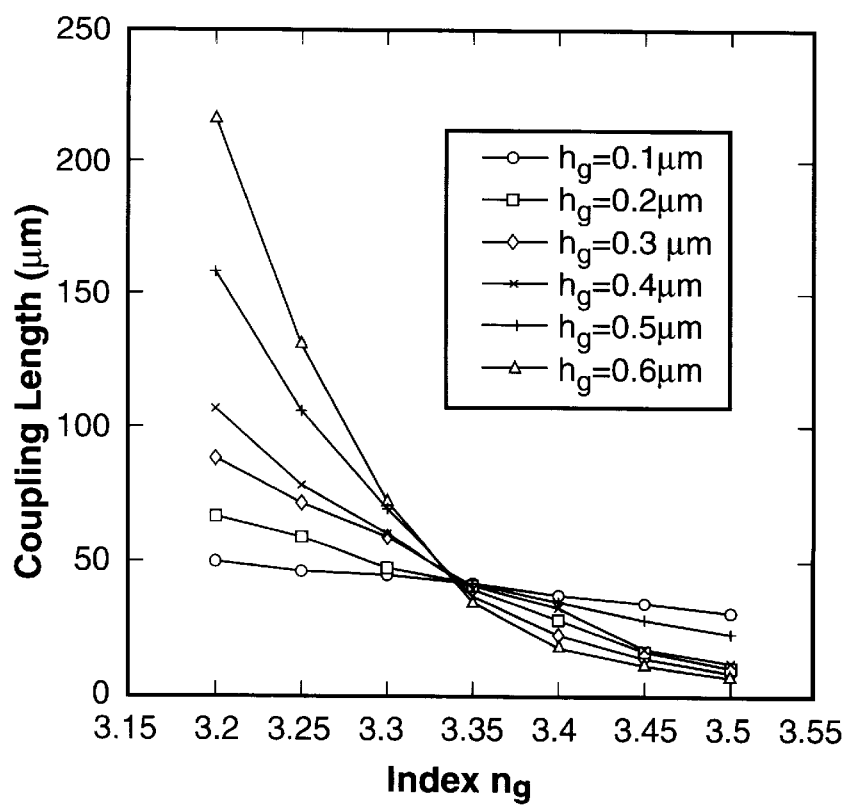
FIG. 4 is a graph showing coupling length as a function of gap index for different thicknesses of gap layer for a fused vertical coupler of the type shown in FIG. 1.

Referring to FIG. 4, we found that increasing the gap index will reduce the coupling length; on the other hand, when the gap region has small indices close to the InP layer, increasing its thickness will decouple the two waveguides and thus increase the coupling length. However, when the index of the gap layer is large (close to 1.3 $\mu$m quartenary), the mode amplitude in this region will increase the overlap integral between mode of adjacent waveguides and thus reduces the coupling length.

Figure 5:
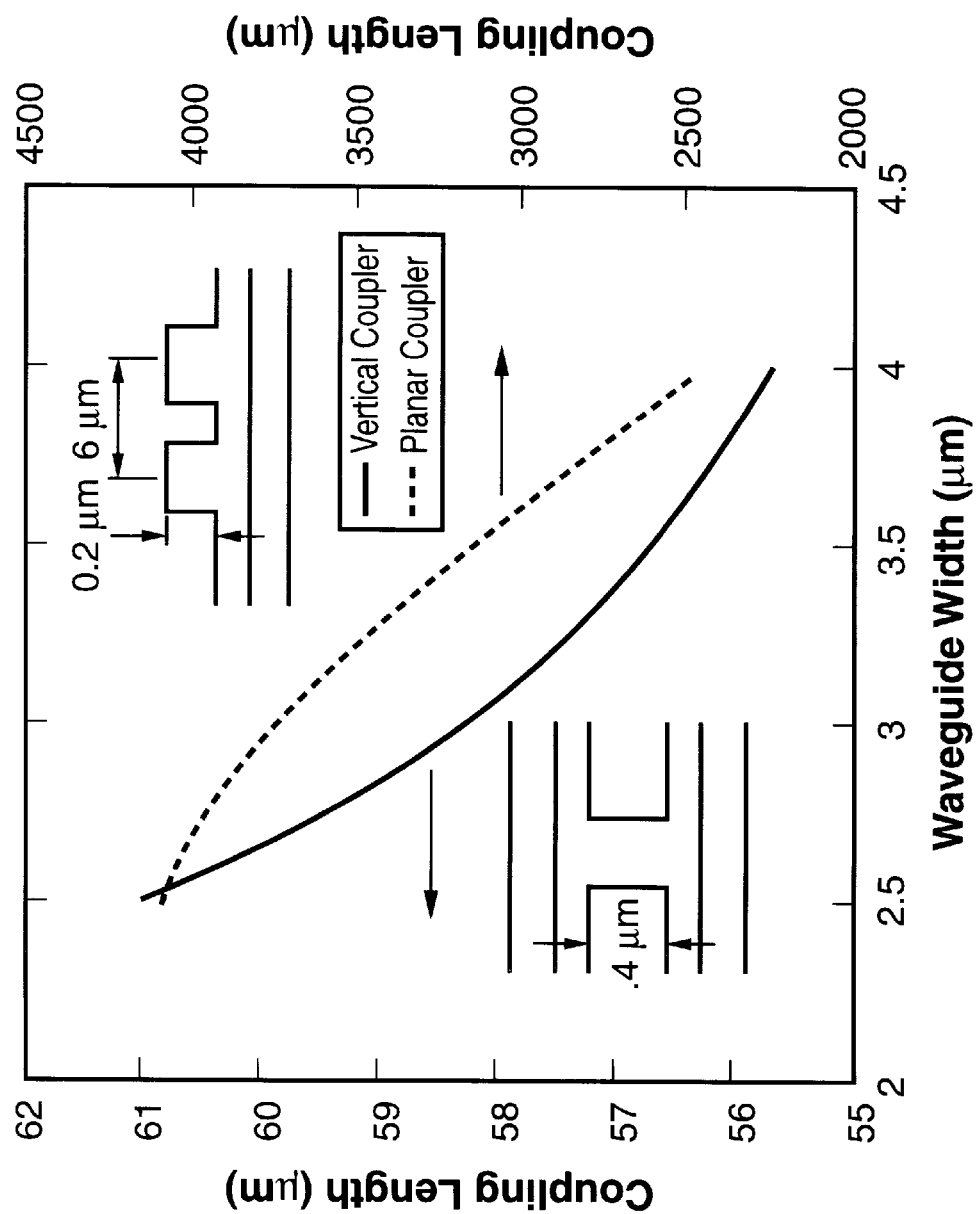
FIG. 5 is a graph showing coupling length as a function of waveguide width for a fused vertical coupler of the type shown in FIG. 1 (solid line) compared to a conventional planer coupler (dashed line).

Referring to FIG. 5, we found that vertical coupling through the ridge structure whose height is defined by etch-stopping techniques is much less sensitive to the ridge waveguide width and sidewall smoothness than planar waveguide couplers. For example, in a conventional ridge-loaded structure with a 0.5 μm In GaAsP (λ=1.31 μm) core layer, 0.1 μm InP slab layer, 0.2 μm InP ridge, and a waveguide spacing of 6 μm at the center, a change of 1 μm in waveguide width will change the coupling length by 30% to 40%. When the same waveguides are coupled vertically according to the present invention, however, the coupling length will be about two orders of magnitude smaller and at the same time less sensitive to waveguide width variation.

It will be appreciated, therefore, that fused vertical coupler 10 comprises a single-mode ridge-loaded waveguide structure on a InP substrate which is vertically coupled through a fused gap layer to an identical waveguide. The foregoing experimental results demonstrate the feasibility of a fused vertical coupler with a 62 μm coupling length. It was shown that 1.1 dB/cm excess optical loss is introduced due to fusion process, which is even lower than the loss caused by doping. Fused vertical couplers and waveguides give us the added advantage of vertical by separating the input and output waveguides to realize compact and scalable 3D directional coupler structures.

2. Fused Vertical Coupler Switches

Vertical directional couplers are attractive candidates to realize photonic switches and narrowband filters because of their very short coupling length and the feasibility of integration with other optoelectronic devices. However in conventional vertical couplers, the two input or output waveguides are so close together that direct coupling of individual waveguides with fibers is very difficult. This has limited the practical applications of vertical couplers in fiber optic systems.

By displacing the input and output waveguides vertically in different planes, separation of two strongly coupled waveguides and a scalable switch array can be easily realized with fused vertical couplers. As discussed previously, a passive fused vertical coupler with a very short coupling length of approximately 62 μm has been demonstrated. For purposes of switches arrays, we apply this technique to create a PIN straight fused vertical coupler.

Figure 6:
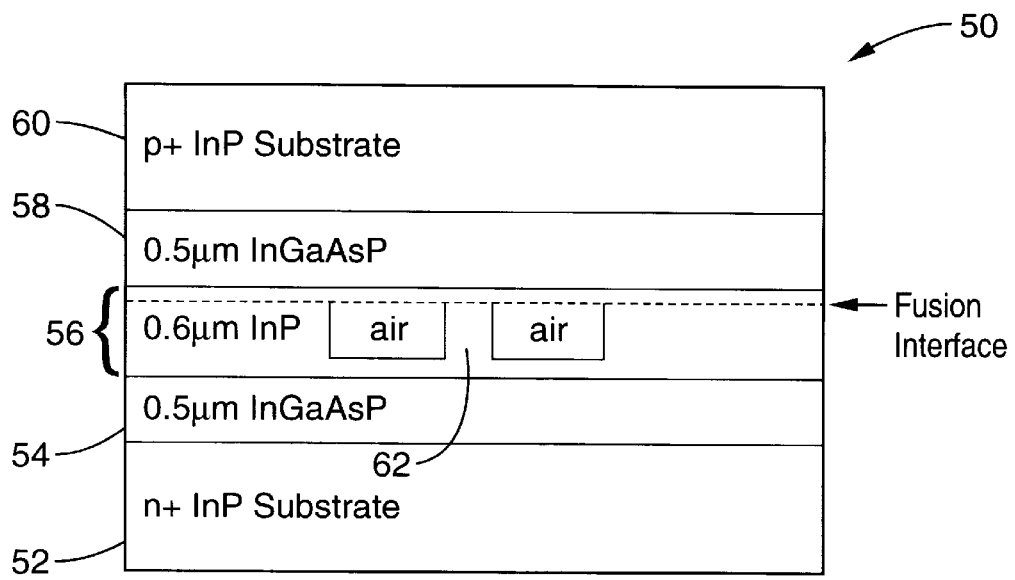
FIG. 6 is a schematic side view of an alternative embodiment of a fused vertical coupler according to the present invention. The ridge waveguide in the center is "protected" during fusion process by the large slab regions on the two sides.

A schematic of a PIN fused vertical coupler 50 according to the present invention is shown in FIG. 6. The coupler comprises an n+ InP substrate 52, followed by an approximately 0.5 μm InGaAsP guiding layer 54, followed by an approximately 0.1 μm InP cladding layer, an approximately 0.4 μm InP coupling layer, and another approximately 0.1 μm InP cladding layer to form the approximately 0.6 μm InP layer 56 shown, another approximately 0.5 μm InGaAsP guiding layer 58, and a p+ InP substrate layer 60. To support the narrow, 2 μm to 5 μm wide, 0.4 μm high ridges waveguide 62 during the fusion process, 10 μm wide InP layers were etched on both sides of the ridges as shown in FIG. 6. The adjacent ridge waveguides were separated by 125 μm.

EXAMPLE 5

To fabricate the coupler shown, two wafers were grown using MOCVD. One was on a n+ InP substrate and the other one on a p+ substrate. Each sample had an approximately 0.5 μm InGaAsP ($\lambda_g$=1.3 μm) guiding layer, followed by an approximately 0.1 μm InP cladding layer, an approximately 20 nm InGaAsP ($\lambda_g$=1.15 μm) etch stop layer, and finally an approximately 0.4 μm InP coupling layer. All layers were undoped. Device fabrication started by cleaving two approximately 10×12 mm$^2$ samples from the grown wafers. In one sample, the top 0.4 μm InP layer was removed. On another sample, a ridge waveguide structure along the [110] direction was fabricated using standard photolithography and selective wet etching techniques. The two samples were then aligned, mated, and fused together at a temperature of 630° C. in a hydrogen atmosphere for 30 minutes. After fusion, the sample was thinned to 200 μm using an HCL etchant. Then, 300 nm gold was deposited on both sides for applying the bias voltage. All layers were undoped.

EXAMPLE 6

Figure 7:
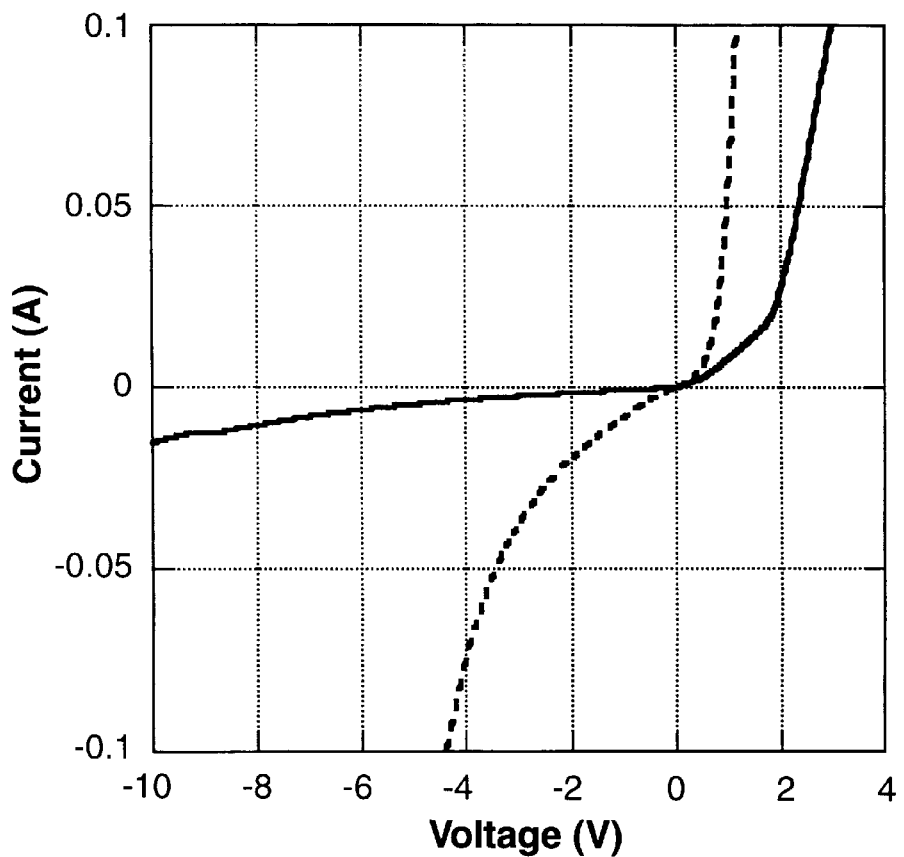
FIG. 7 is a graph showing current-voltage curves of a PIN fused vertical coupler of the type shown in FIG. 6 with broad (dashed line) and narrow (solid line) ohmic contacts.

FIG. 7 shows the measured current-voltage curves of the fused vertical coupler thus fabricated for broad (dashed line) and narrow (solid line) ohmic contacts. The sample size was 3.5×4.5 mm$^2$. Since 80% of the area of two samples are fused together, and only 3% of this area is the actual ridge waveguide, there is a large leakage current that can be reduced by etching mesas and depositing metal only on the fused vertical coupler ridge regions. When wafer fusion technique is used to fabricate VCSELs and detectors, those devices are relatively small and uniformity of the fused material is not so critical for individual device operation. To make long waveguide couplers and switches, on the other hand, requires a good uniformity of the fusion interface.

EXAMPLE 7

We used electroluminescence images of the fused vertical couplers to study the fusion uniformity under current flow. The near field pattern at the output facet of the coupler was observed by an IR camera with an 80× objective lens. We examined a luminescence image of the fused area at 200 mA forward current. The image area was 64 μm wide. Luminescence from the two quartenary layers could be clearly distinguished. There were no dark areas and the intensity was very uniform along the fused interface.

EXAMPLE 8

Figure 8:
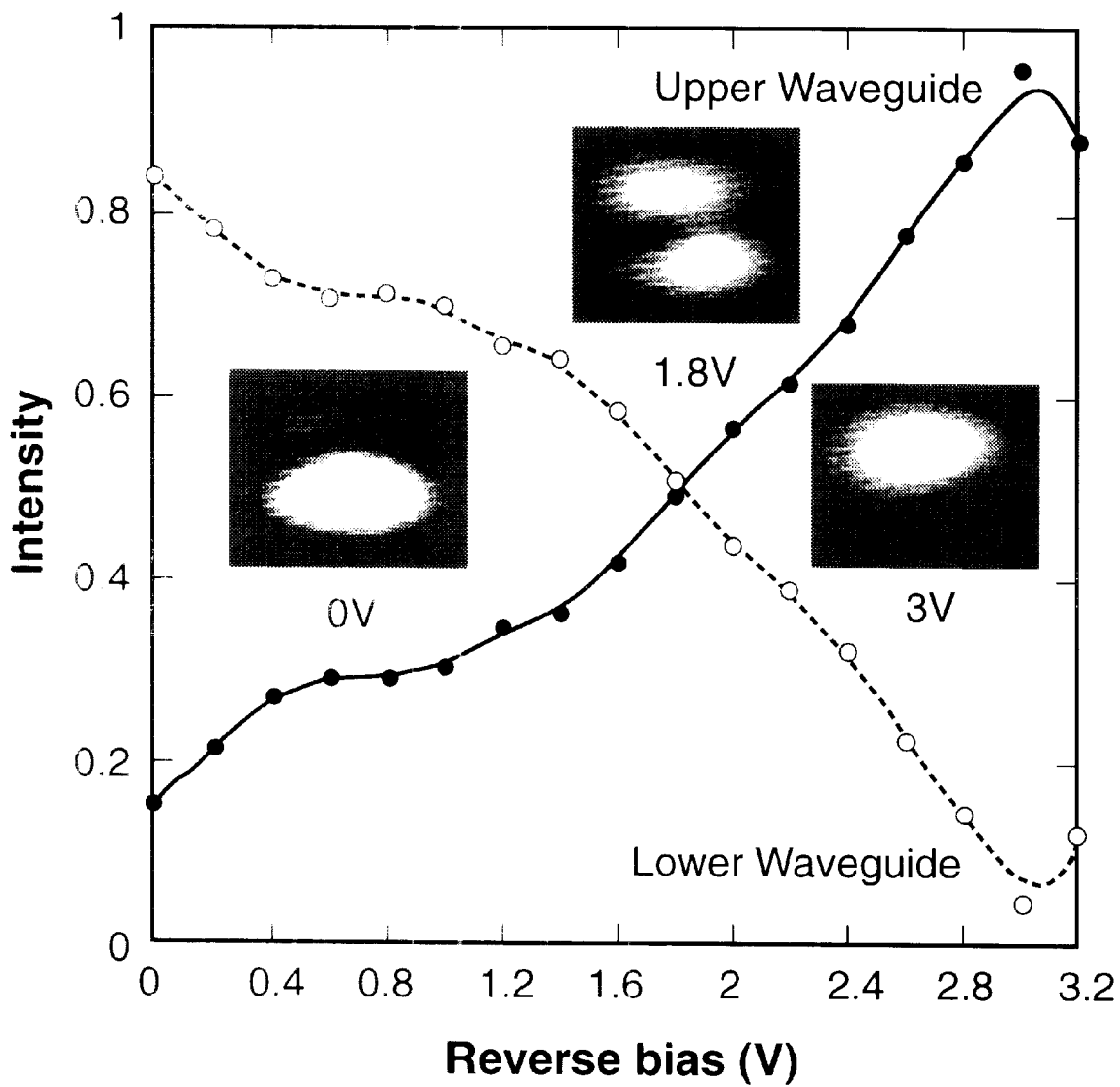
FIG. 8 is a graph showing measured intensity of the upper (closed circle) and lower (open circle) waveguides as a function of reverse bias for a broad area ohmic contact fused vertical coupler of the type shown in FIG. 6.
Figure 9:
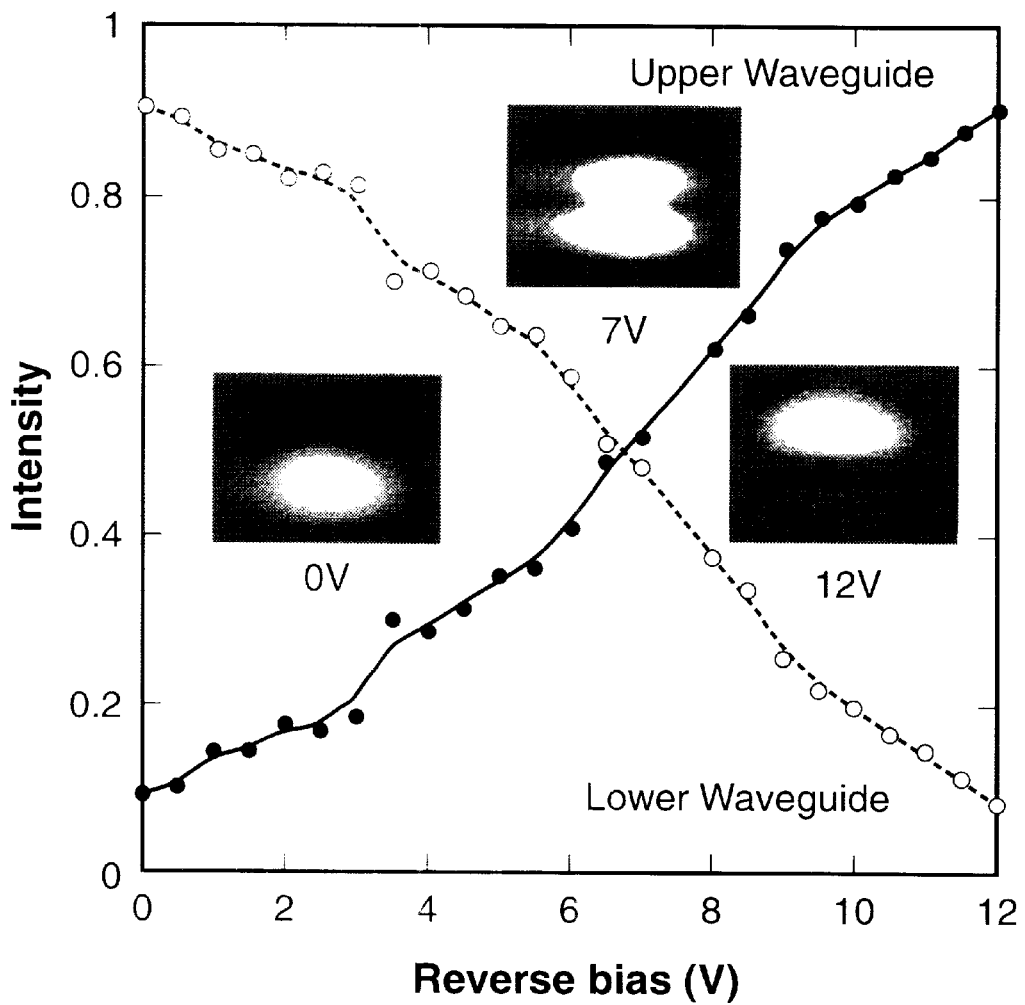
FIG. 9 is a graph showing measured intensity of the upper (closed circle) and lower (open circle) waveguides as a function of reverse bias for a narrow area ohmic contact fused vertical coupler of the type shown in FIG. 6.

To characterize fused vertical couplers, a tunable laser was used to launch light at the input of the coupler through an 8 μm diameter single mode fiber. The near field images at the output of a 3.5 mm long fused vertical coupler for three reverse biases 0V, 1.8V and 3V for a broad ohmic contact FVC according to the invention are shown in FIG. 8, along with the normalized intensities of upper and lower waveguides. The linear electrooptic effect at 3V is too small to explain the switching. We believe that the thermo-optic effect plays a major role in this device because of the high leakage current which contributes to internal heating of this structure. To confirm this, we changed the stage temperature, and switching is observed when 30° C. temperature change. In order to reduce the leakage current, we fabricated another fused vertical coupler. In this case, one of the InP substrates was removed and the electrodes were evaporated on the exact ridge area through narrow windows of a SiN insulation layer. The solid line in FIG. 7 represents the current-voltage curve of a 7 mm×3 μm fused vertical coupler with this modification. As it can be seen in FIG. 9, a 12V reverse bias is needed to achieve switching. The insert diagrams shown the corresponding near fields at different biases.

As can be seen, therefore, switching of fused vertical couplers according to the invention has been demonstrated. For bulk InGaAsP materials, we found that a 12V reverse bias is needed to realize the switching for a 6.9 mm long device. Using quantum well structures, the switching voltage can be further reduced. The wafer fusion technique can be used to fabricate vertical couplers and 3D photonic integrated circuits without requiring complicated regrowths.

Figure 10:
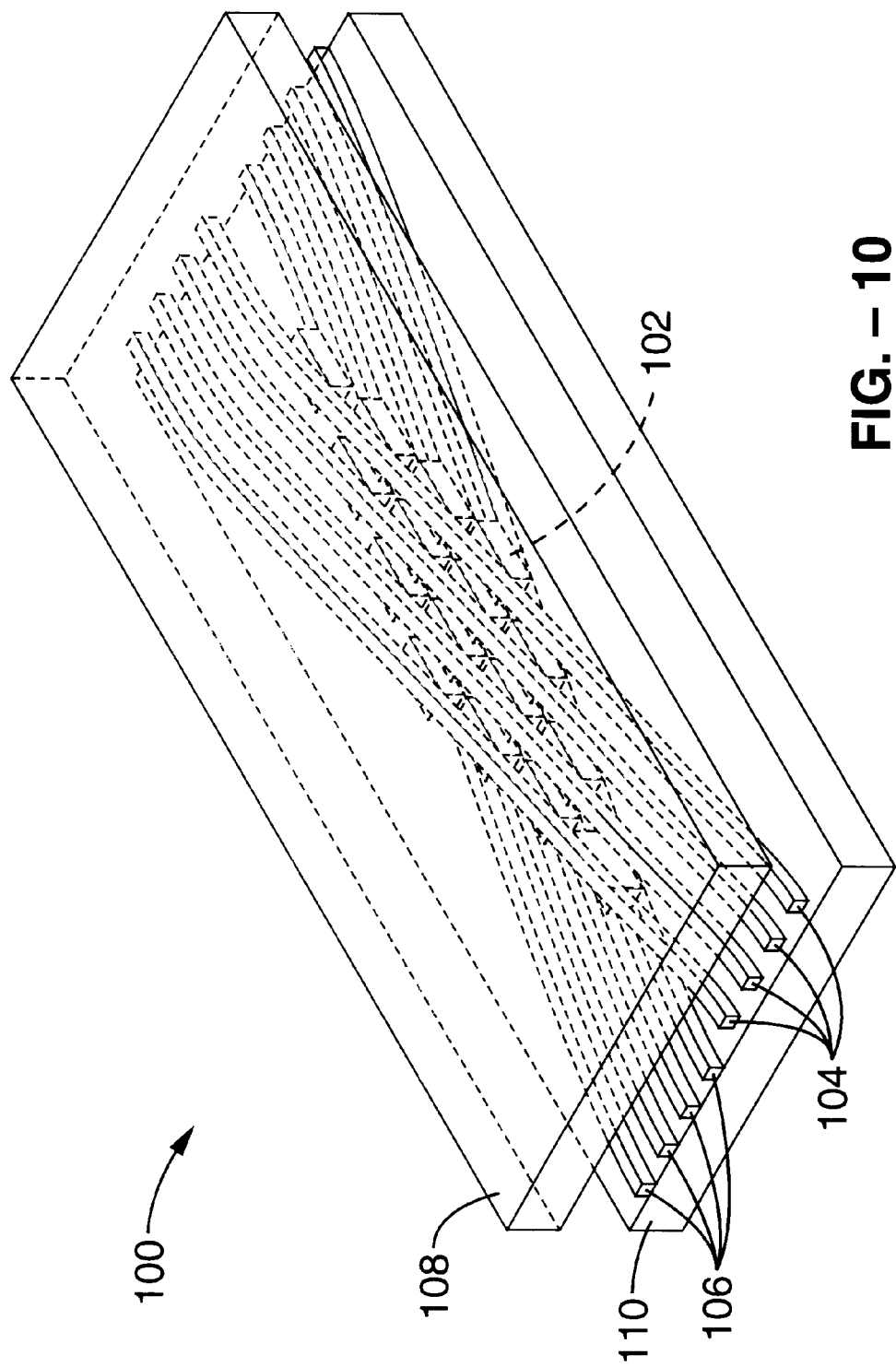
FIG. 10 is a perspective diagrammatic view of a 4×4 crossbar switch array based using fused vertical couplers between two substrates.
Figure 11:
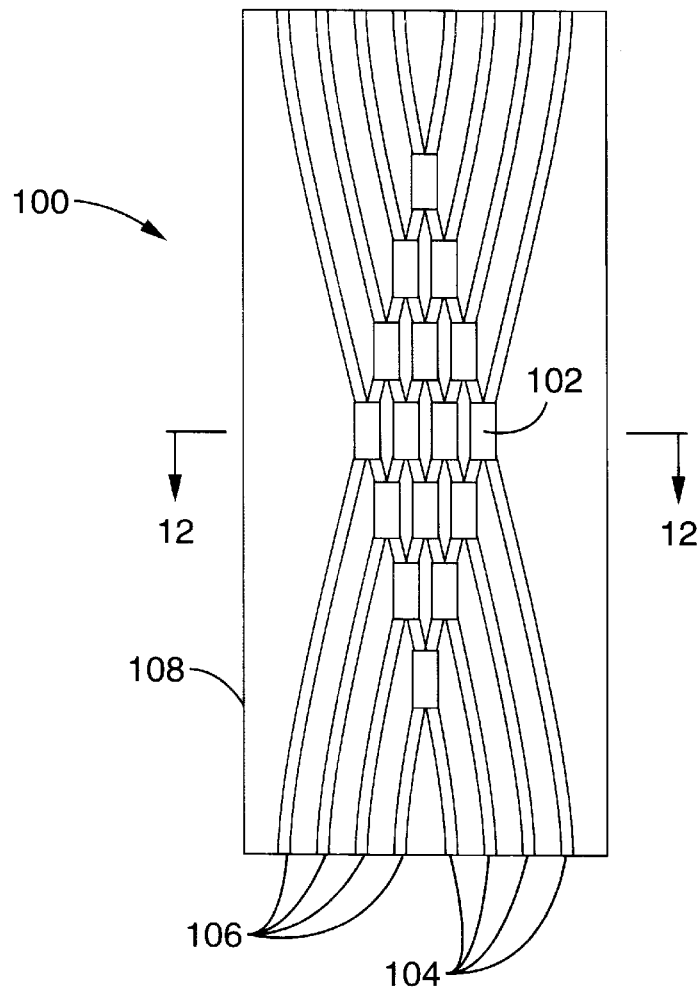
FIG. 11 is a diagrammatic plan view of the switch array shown in FIG. 10.
Figure 12:
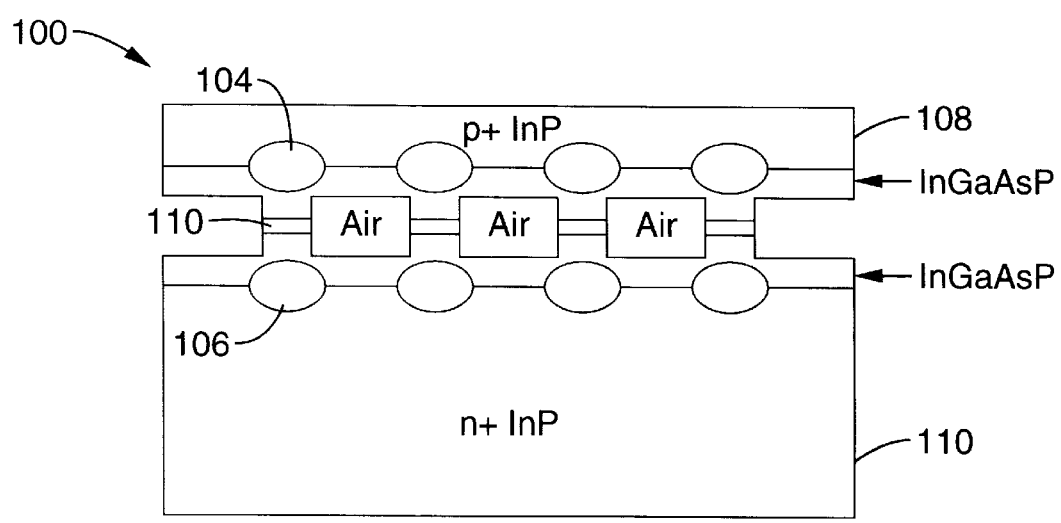
FIG. 12 is a diagrammatic cross sectional view of the coupling mechanism of the switch array shown in FIG. 10 and FIG. 11 taken through line 12—12 in FIG. 11.

Referring now to FIG. 10 through FIG. 12, a 4×4 optical cross-connect switch 100 based on fused vertical coupling between two substrates is shown. In switch 100, fused vertical couplers 102 are used to combine planar waveguides 104, 106 on two different substrates 108, 110 into a three-dimensional structure 100 in which there is vertical coupling between arrays of single mode waveguides through the fused regions 110. As discussed previously, application of a bias at the fused regions 112 will allow a change of gain or index for switching purposes.

3. Fused InP/GaAs Vertical Coupler Filters

Figure 13B:
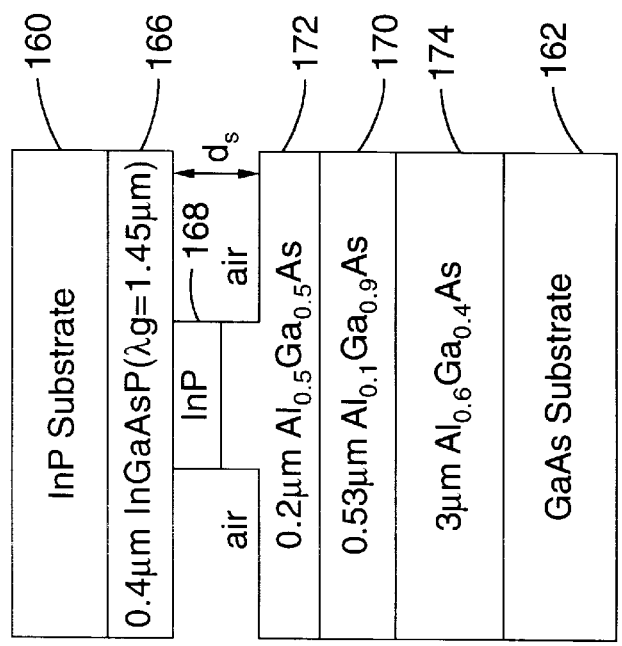
FIG. 13A and FIG. 13B are schematic views of a fused InGaAsP/InP-AlGaAs/GaAs vertical coupler filter with separated inputs and outputs for add/drop applications according to the present invention.
Figure 13A:
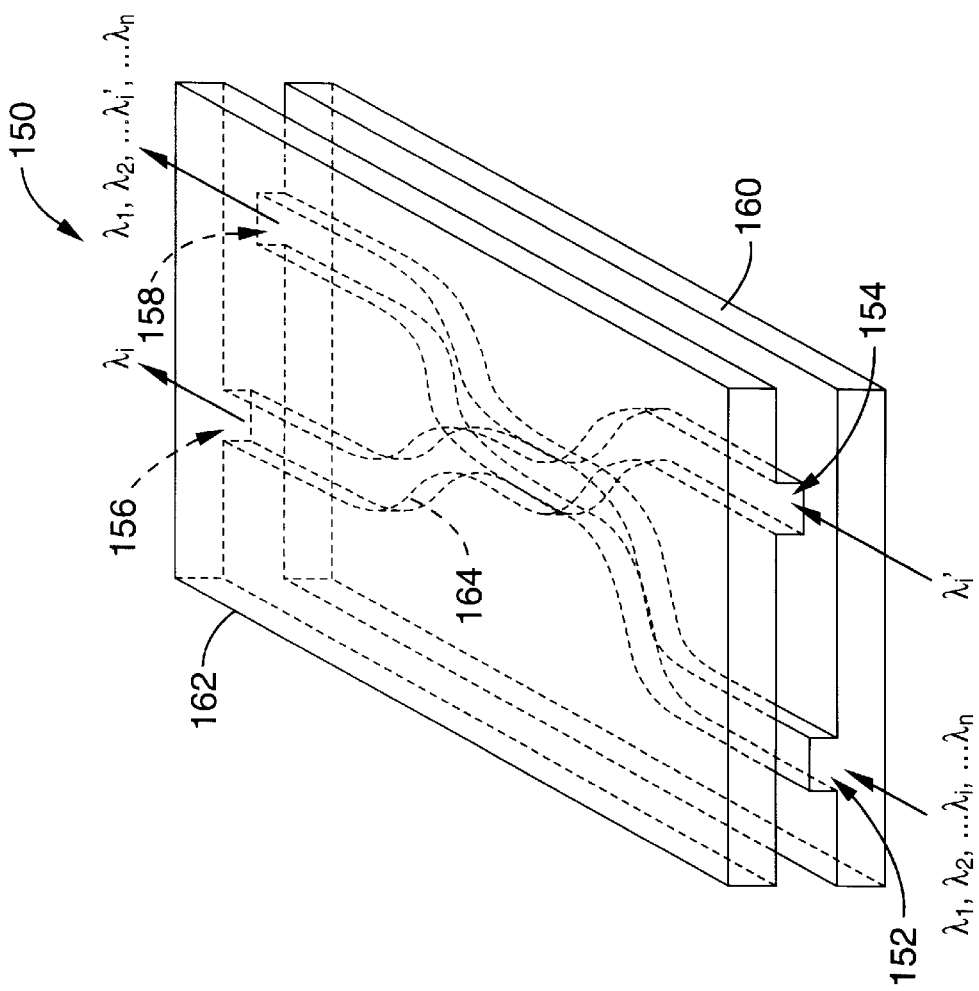

Referring to FIG. 13A and FIG. 13B, a vertical coupler filter 150 with separated inputs and outputs according to the present invention is shown. Using wafer fusion, the two close inputs 152, 154 and two outputs 156, 158 can be easily separated in different planes. FIG. 13A schematically depicts a fused InGaAsP/InP-AlGaAs/GaAs vertical coupler filter with separated inputs and outputs.

Figure 14:
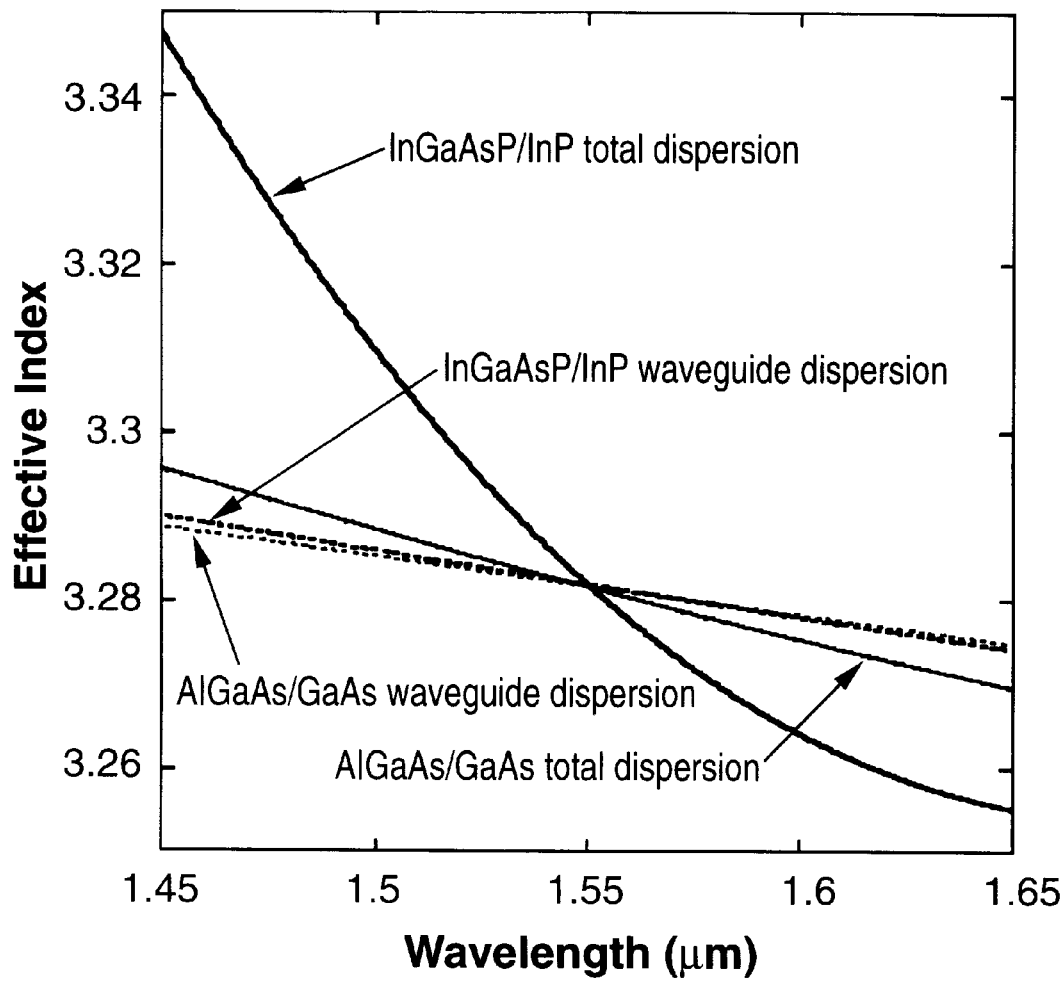
FIG. 14 is a graph showing the calculated waveguide dispersions and total dispersions of the InGaAsP/InP and AlGaAs/GaAs waveguides for the fused vertical coupler filter shown in FIG. 13A and FIG. 13B.
Figure 15:
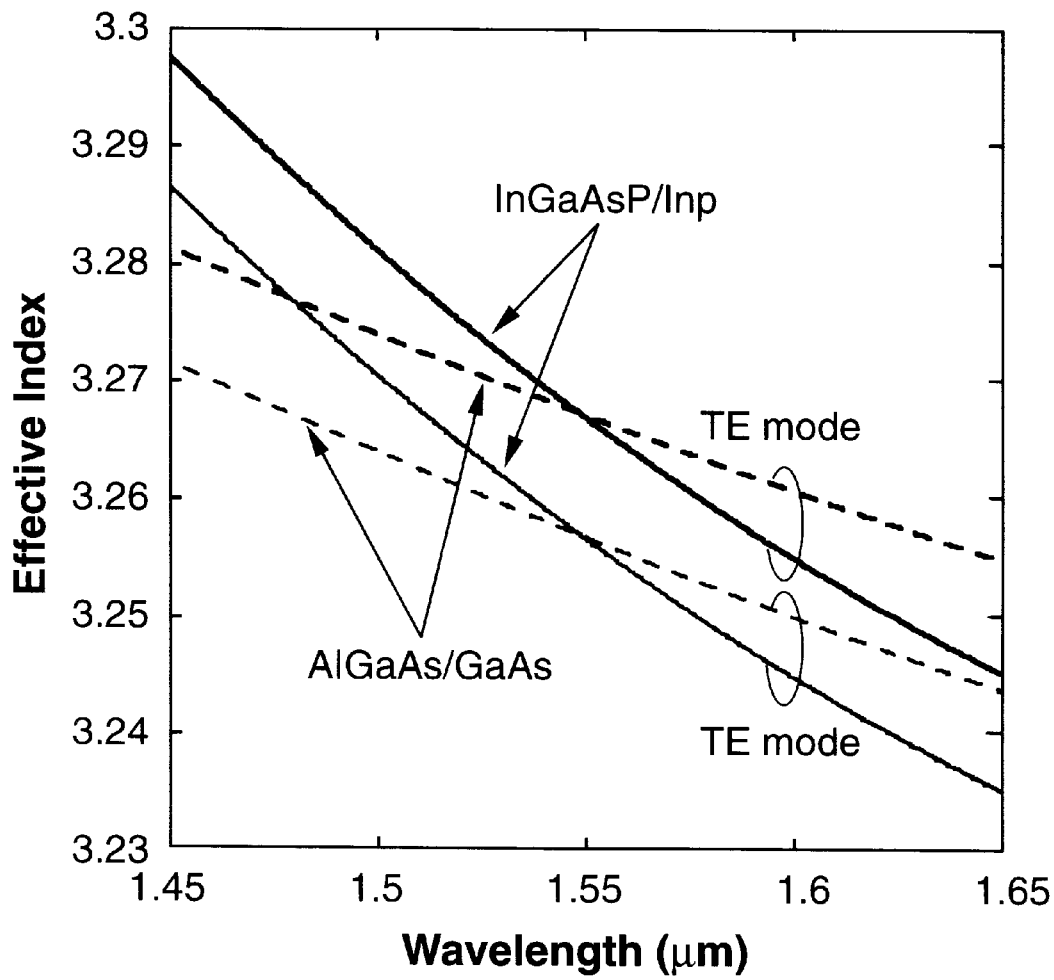
FIG. 15 is a graph showing the calculated effective index for TE and TM modes of the waveguides shown in FIG. 13A and FIG. 13B, where the InGaAsP/InP waveguide has a 0.4 $\mu$m quaternary ($\lambda_g$=1.37 $\mu$m) and a 0.1 $\mu$m InP cladding layer, and where the AlGaAs/GaAs waveguide has the same characteristics except that the core thickness is 0.46 $\mu$m.

FIG. 13B schematically shows a cross-section of the fused vertical coupler filter illustrated in FIG. 13A built on a upper InP substrate 160 and a lower GaAs substrate 162. The upper InGaAsP/InP waveguide 164 comprises a 0.4 $\mu$m InGaAsP ($\lambda$g=1.45)) guiding layer 166 and a 1.2 $\mu$m InP cladding layer 168. The lower AlGaAs/GaAs waveguide includes a 0.53 $\mu$m $Al_{0.1}Ga_{0.9}As$ core 170 and a 0.2 $\mu$m $Al_{0.5}Ga_{0.5}As$ cladding layer 172. The 3 $\mu$m $Al_{0.6}Ga_{0.4}As$ layer 174 is for isolating substrate modes. The two waveguides described are phase matched at 1.55 $\mu$m. FIG. 14 shows waveguide and total dispersions of 3 $\mu$m wide upper InGaAsP/InP and lower AlGaAs/GaAs waveguides calculated by transfer matrix method with effective index approximation. The waveguide dispersions of the two waveguides are very small and almost identical, so the material dispersion dominates in our vertical coupler filter. In the current structure, because of similar waveguide structures, there is only 8 nm polarization dependent wavelength shift which is much less than the value of more than 30 nm in the conventional vertical coupler filter. It is easy to realize polarization independent vertical coupler filters by replacing 1.45 $\mu$m quartenary with 1.37 $\mu$m quartenary. This is shown in FIG. 15. Since the material dispersion of 1.37 $\mu$m quaternary is little lower than that of 1.45 $\mu$m quartenary, a small bandwidth will be sacrificed in this structure.

EXAMPLE 9

Figure 16:
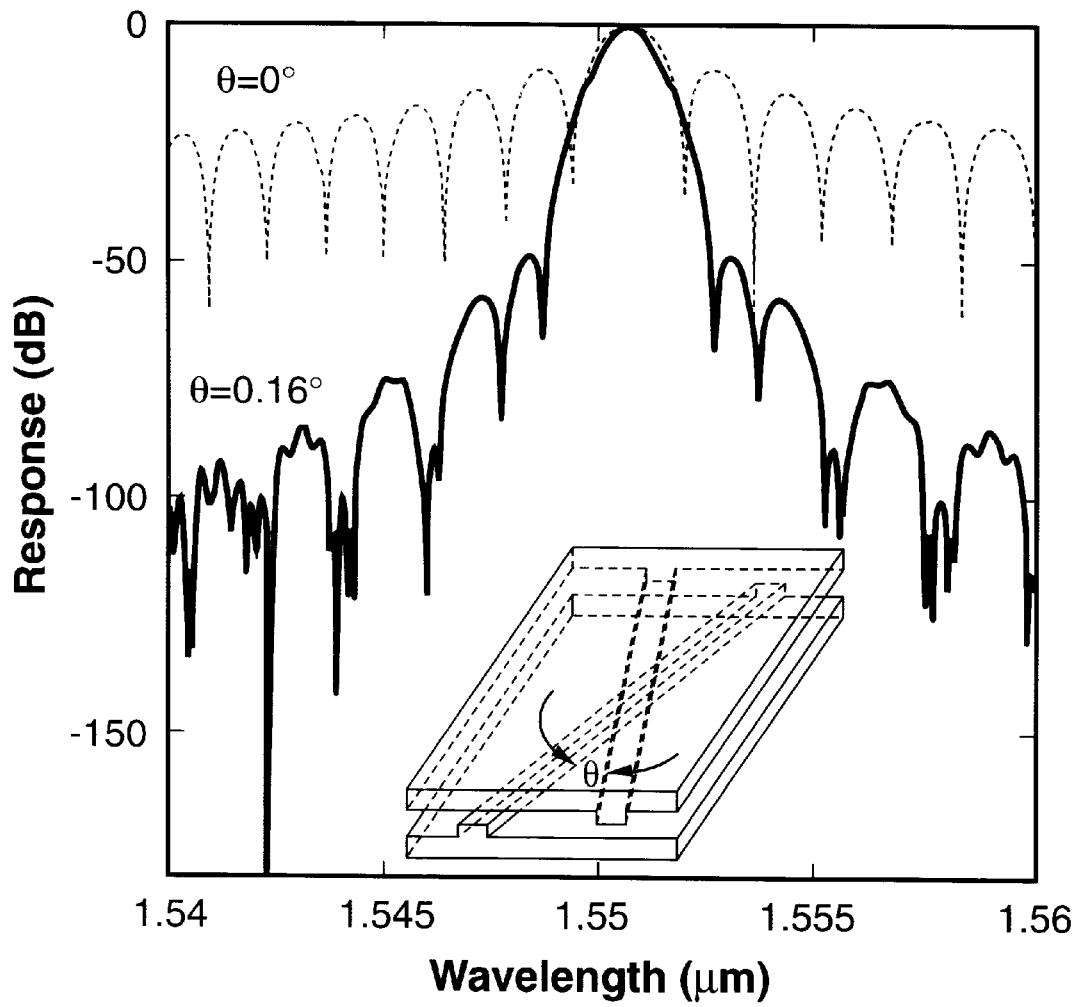
FIG. 16 is a graph showing the response of an X-crossing band fused vertical coupler filter according to the present invention having a configuration as shown in the inset schematic in the graph, for $\theta=0°$ and 0.16° and for $d_s$=1.2 $\mu$m.

Using 3D beam propagation method (BPM), the performance of fused filters was simulated. When the separation of two waveguides $d_s$=1.2 $\mu$m, 1.6 $\mu$m and 2 $\mu$m, the corresponding coupling lengths (100% power transfer) are 1 mm, 4.5 mm and 2 cm and the bandwidths are 4 nm, 0.8 nm and 0.2 nm at the coupling length. As we expected, the central wavelength is independent of the separation distance of two waveguides and the bandwidth is inversely proportional to the coupler length. Because of uniform coupling, there is a −9 dB side lobe, which is too high for practical application. By using X-crossing structure, the side lobe can be suppressed to more than −40 dB, which satisfies the requirement of most WDM systems. FIG. 16 shows the calculated response of an X-crossing fused vertical coupler with a crossing angle 0.16° using coupled mode theory. One should note that the fabrication of X-crossing vertical coupler filter structure with separated inputs and outputs is very easy with the use of wafer fusion technology.

Figure 17:
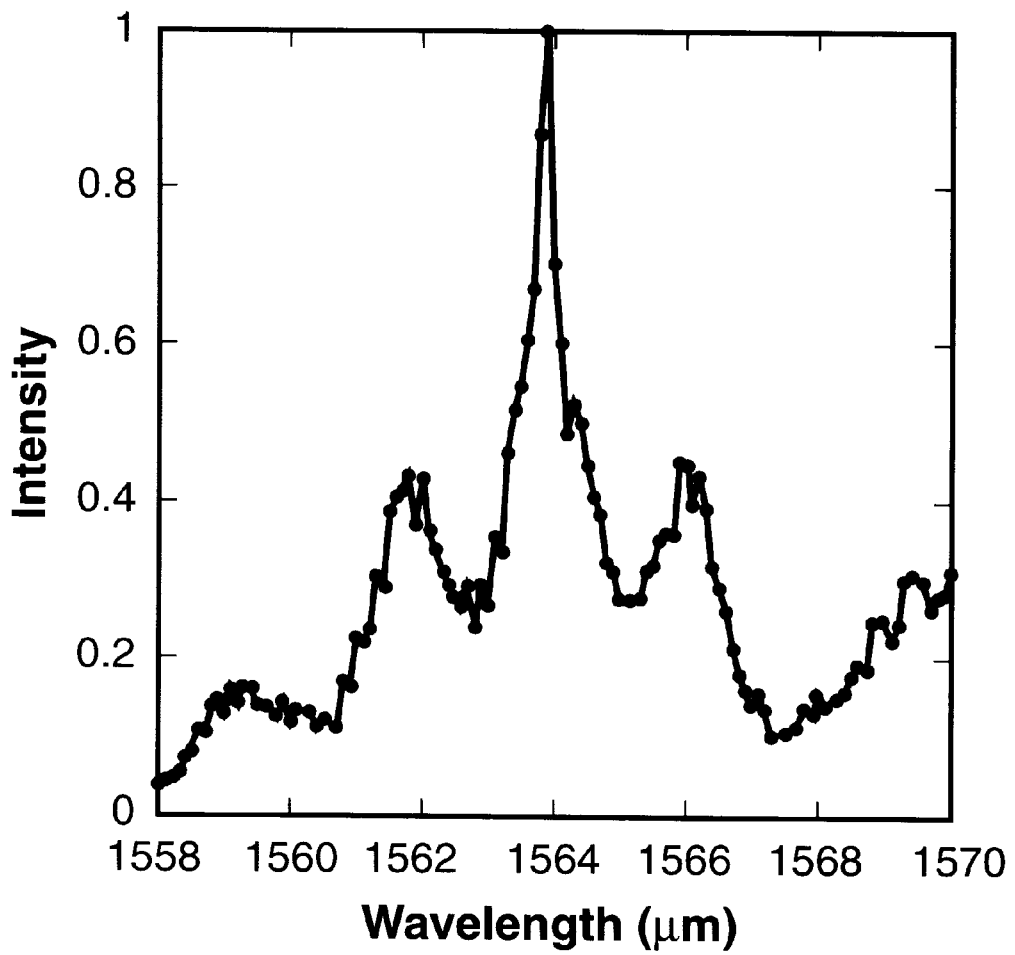
FIG. 17 is a graph showing measured response of a 5 $\mu$m wide fused vertical coupler used in the filter shown in FIG. 13A and FIG. 13B.

As can be seen, therefore, we have fabricated a fused vertical coupler filter based on MBE grown GaAs and MOCVD grown InP waveguides. The structure is shown in FIG. 13A and FIG. 13B and the separation of two waveguides is 1.2 $\mu$m, which corresponds to 1 mm coupling length. A 3 mm long device has been measured. FIG. 17 shows the measured response, the 3 dB bandwidth is 1.2 nm which agrees very well with the theoretical value of 1.3 nm. The polarization dependent waveguide shift is only 5 nm. Theoretical calculations predict a 7 nm shift, and as shown in FIG. 3, this polarization dependence can be eliminated with proper design.

In conclusion, a novel fused vertical coupler filter has been demonstrated. Due to its inherent polarization-independence and narrowband which comes from a large material dispersion difference between InGaAsP/InP and AlGaAs/GaAs waveguides, this kind of fused filters will be very promising in WDM systems. Furthermore, these fused waveguide structures can be used to realize tunable wavelength lasers and wavelength selective detectors. The large material dispersion difference between InGaAsP and AlGaAs around 1.55 $\mu$m and similar waveguide geometries are used to realize a less sensitive polarization and narrowband filter with two separated inputs and outputs and more than −40 dB sidelobe suppression should be possible.

Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A fused vertical electro-optic construct comprising a first waveguide structure on a first substrate which is vertically coupled through a fused gap layer to a second waveguide structure on a second substrate.

2. A fused vertical electro-optic coupler construct, comprising:
    (a) a first substrate layer;
    (b) a first waveguide layer adjacent to said first substrate layer;
    (c) a second substrate layer;
    (d) a second waveguide layer adjacent to said second substrate layer;
    (e) a fused gap layer between said waveguide layers joining and optically coupling said waveguide layers.

3. A fused vertical electro-optic construct as recited in claim 2, wherein at least one of said waveguide layers comprises a single-mode ridge-loaded waveguide structure.

4. A fused vertical electro-optic construct as recited in claim 2, wherein at least one of said substrates comprises InP.

5. A fused vertical electro-optic construct comprising a first single-mode ridge-loaded waveguide structure on a substrate which is vertically coupled through a fused gap layer to a second single-mode ridge loaded waveguide structure on a substrate.

6. A fused vertical electro-optic construct as recited in claim 5, wherein at least one of said substrates comprises InP.

7. A fused vertical electro-optic coupler, comprising:
    (a) a first InP substrate layer;
    (b) a first InGaAsP guiding layer adjacent to said first substrate layer;
    (c) an InP coupling layer adjacent to said first guiding layer;
    (d) a second InP cladding layer adjacent to said coupling layer;
    (e) a second InGaAsP guiding layer adjacent to said second cladding layer; and
    (f) a second InP substrate layer adjacent to said second guiding layer (g) said coupling layer being fusion bonded to a said one of said cladding layers.

8. A fused vertical electro-optic coupler as recited in claim 7, wherein said InP substrates are undoped.

9. A fused vertical electro-optic coupler as recited in claim 7, wherein said first InP substrate is doped n+ and said second InP substrate is doped p+.

10. A fused vertical electro-optic coupler as recited in claim 7, wherein each said guiding layer has a thickness of approximately 0.5 µm.

11. A fused vertical electro-optic coupler as recited in claim 7, wherein each said cladding layer has a thickness of approximately 0.1 µm.

12. A fused vertical electro-optic coupler as recited in claim 7, further comprising a ridge waveguide proximate to said coupling layer.

13. A fused vertical electro-optic coupler as recited in claim 7, wherein said coupling layer has a thickness of approximately 0.4 µm.

14. A fused vertical electro-optic coupler, comprising:
  (a) an n+ doped InP substrate layer;
  (b) a first InGaAsP guiding layer adjacent to said n+ doped substrate layer;
  (c) an InP coupling layer adjacent to said first guiding layer;
  (d) a second InP cladding layer adjacent to said coupling layer;
  (e) a second InGaAsP guiding layer adjacent to said second cladding layer; and
  (f) a p+ doped InP substrate layer adjacent to said second guiding layer
  (g) said coupling layer being fusion bonded to a said one of said cladding layers.

15. A fused vertical electro-optic coupler as recited in claim 14, wherein each said guiding layer has a thickness of approximately 0.5 µm.

16. A fused vertical electro-optic coupler as recited in claim 14, wherein each said cladding layer has a thickness of approximately 0.1 µm.

17. A fused vertical electro-optic coupler as recited in claim 14, further comprising a ridge waveguide proximate to said coupling layer.

18. A fused vertical electro-optic coupler as recited in claim 14, wherein said coupling layer has a thickness of approximately 0.4 µm.

19. A fused vertical electro-optic coupler, comprising:
  (a) a GaAs substrate layer;
  (b) an InP substrate layer;
  (c) an InGaAsP guiding layer between said GaAs substrate layer and said InP substrate layer;
  (d) an InP cladding layer between said InP coupling a layer and said InP substrate layer;
  (e) an AlGaAs cladding layer between said InP coupling layer and said GaAs substrate layer;
  (f) an AlGaAs core layer between said AlGaAs cladding layer and said GaAs substrate layer; and
  (g) an AlGaAs isolation layer between said AlGaAs core layer and said GaAs substrate layer;
  (h) said InP coupling layer fusion bonded to a said one of said cladding layers.

20. A fused vertical electro-optic coupler as recited in claim 19, wherein said InGaAsP guiding layer has a thickness of approximately 0.4 µm.

21. A fused vertical electro-optic coupler as recited in claim 19, wherein said InP cladding layer has a thickness of approximately 1.2 µm.

22. A fused vertical electro-optic coupler as recited in claim 19, wherein said AlGaAs cladding layer has a thickness of approximately 0.2 µm.

23. A fused vertical electro-optic coupler as recited in claim 19, wherein said AlGaAs isolation layer has a thickness of approximately 3 µm.

24. A fused vertical electro-optic coupler as recited in claim 19, wherein said AlGaAs core layer has a thickness of approximately 0.53 µm.

25. A method for coupling electro-optic waveguides, comprising the steps of coupling a first waveguide structure on a first substrate to a second waveguide structure on a second substrate through a vertical fused gap layer.

26. A method for coupling electro-optic waveguides, comprising the steps of coupling a first single-mode ridge-loaded waveguide structure on a substrate to a second single-mode ridge loaded waveguide structure on a second substrate through a vertical fused gap layer.

* * * * *